(12) United States Patent
Gretz

(10) Patent No.: US 11,460,128 B1
(45) Date of Patent: Oct. 4, 2022

(54) FLANGED CONDUIT SUPPORT WITH GANGING MECHANISM

(71) Applicant: Arlington Industries, Inc., Scranton, PA (US)

(72) Inventor: Thomas J. Gretz, Delray Beach, FL (US)

(73) Assignee: ARLINGTON INDUSTRIES, INC., Scranton, PA (US)

( * ) Notice: Subject to any disclaimer, the term of this patent is extended or adjusted under 35 U.S.C. 154(b) by 359 days.

(21) Appl. No.: 16/846,571

(22) Filed: Apr. 13, 2020

Related U.S. Application Data

(60) Provisional application No. 62/910,744, filed on Oct. 4, 2019, provisional application No. 62/885,279, filed on Aug. 11, 2019.

(51) Int. Cl.
*F16L 3/00* (2006.01)
*F16L 3/123* (2006.01)
*E04G 15/06* (2006.01)
*F16L 5/00* (2006.01)

(52) U.S. Cl.
CPC ............ *F16L 3/123* (2013.01); *E04G 15/061* (2013.01); *F16L 5/00* (2013.01)

(58) Field of Classification Search
None
See application file for complete search history.

(56) References Cited

U.S. PATENT DOCUMENTS

| | | | | |
|---|---|---|---|---|
| 390,003 | A * | 9/1888 | Converse | F16L 5/00 126/317 |
| 1,010,659 | A * | 12/1911 | McCAbe et al. | F16L 5/00 126/317 |
| 2,549,192 | A * | 4/1951 | Gresham | F16L 3/00 126/318 |
| 2,813,692 | A * | 11/1957 | Peterson | H01B 17/306 277/606 |
| 4,626,620 | A * | 12/1986 | Plyler | H02G 3/083 285/151.1 |
| 4,656,689 | A * | 4/1987 | Dennis | F16L 5/027 16/2.2 |
| 5,896,892 | A | 4/1999 | Adamson et al. | |
| 6,725,611 | B2 | 4/2004 | DeFiglio | |
| D534,060 | S | 12/2006 | Kiely | |
| 7,705,240 | B2 * | 4/2010 | Armstrong | H02G 3/088 174/77 R |
| 7,709,755 | B2 * | 5/2010 | Pfister | B60R 16/0222 174/152 G |

(Continued)

*Primary Examiner* — Steven M Marsh

(57) ABSTRACT

A flanged conduit support for running electrical cables between horizontal floors or vertical walls. The flanged conduit support includes a flange and a hub with a socket. A locking means on the flanged conduit support enables the locking together of two or more supports together in a spaced relationship. The locking means includes a male snap member with a tab and a tapered end and the female snap member includes a receiving slot. The flanged conduit support provides a means for rapidly securing a first end of conduit to a form and capping the opposite ends of the conduit to prevent the entry of concrete during the concrete pour. A removable flange portion may be removed after the concrete cures to provide one or more open pathways for running electrical cables through the horizontal floors or vertical walls.

14 Claims, 9 Drawing Sheets

(56) References Cited

U.S. PATENT DOCUMENTS

| | | | |
|---|---|---|---|
| 8,307,592 B2 * | 11/2012 | Chang | F16L 5/14 |
| | | | 52/220.8 |
| 8,398,034 B2 | 3/2013 | Lambert et al. | |
| 9,225,156 B2 | 12/2015 | Boyer | |
| D749,047 S | 2/2016 | Smith | |
| 2005/0109885 A1 * | 5/2005 | Welsh | F16L 59/02 |
| | | | 248/56 |
| 2021/0210938 A1 * | 7/2021 | Guo | H02G 3/0456 |

* cited by examiner

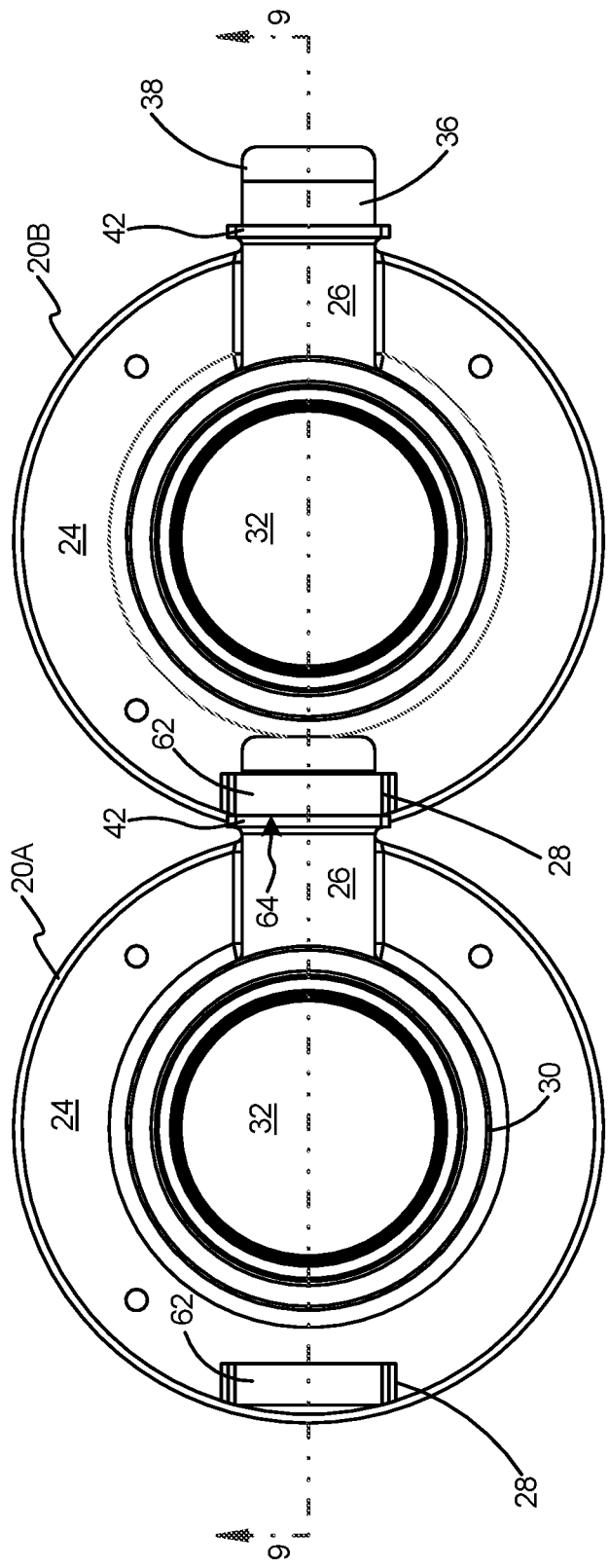
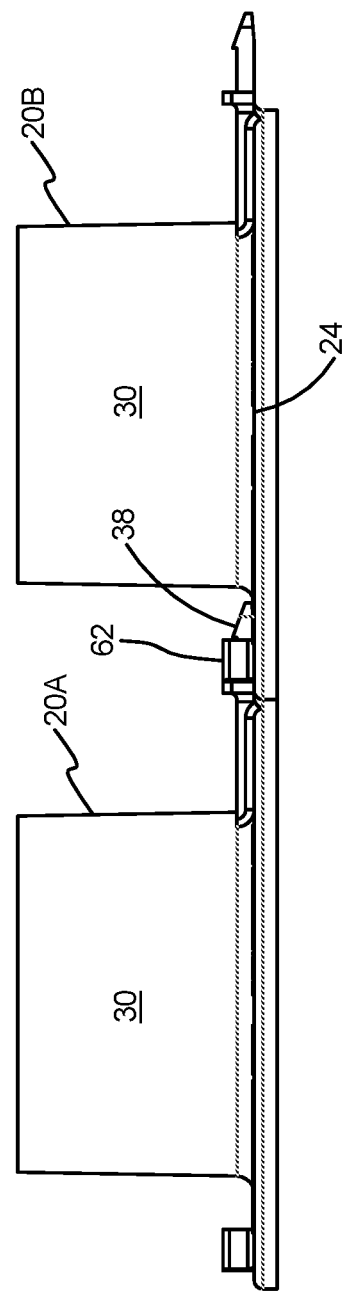
Fig. 7
Fig. 8

FLANGED CONDUIT SUPPORT WITH GANGING MECHANISM

This application claims the priority of Provisional U.S. Patent Application Ser. No. 62/885,279 filed Aug. 11, 2019 and claims the priority of Provisional U.S. Patent Application Ser. No. 62/910,744 filed Oct. 14, 2019, the contents of which are incorporated herein by reference.

FIELD OF THE INVENTION

The present invention relates to the support of electrical conduit in a structure and more specifically to a flanged conduit support for electrical conduit.

BACKGROUND OF THE INVENTION

Running low voltage cable between horizontal concrete floors or vertical walls typically requires an elaborate, expensive support system for multiple EMT conduits. Installers typically brace, wire, or otherwise secure conduit sections to rebar or other structure and then pour concrete to form the floor. Unfortunately, this is a time consuming task and, depending on the number of conduits desired at that location, requires individual, time consuming treatment each multiple conduit configuration.

Accordingly, what is needed is an apparatus and method that provides an easy to use and economical alternative for installation of multiple conduit supports for the purpose of running low voltage cable between horizontal concrete floors or vertical walls.

BRIEF SUMMARY OF THE INVENTION

The current invention is a flanged conduit support for running electrical cables between horizontal floors or vertical walls. The flanged conduit support includes a support body having a flange. A hub extends from the flange and includes a socket therein. One or more apertures are provided in the flange. A locking means is provided on the flanged conduit support to enable the locking together of two or more supports in a spaced relationship. The locking means includes a male snap member and a female snap member. The male snap member includes a tab with a tapered end. The tab includes a top surface with a first stop and a bottom surface with a second stop. The female snap member includes a receiving slot for engaging the tab of the male snap member. The flanged conduit support provides a means for rapidly securing one or more sections of conduit to a form and capping the opposite ends of the conduit to prevent the entry of concrete during the concrete pour. A removable flange portion may be removed after the pour and curing of the concrete to provide pathways for running electrical cables through the horizontal floors or vertical walls.

OBJECTS AND ADVANTAGES

One object of the invention is to provide a support apparatus for anchoring one or more electrical conduits to a structure.

A further object of the invention is to provide a support apparatus for anchoring one or more electrical conduits to a form that will be filled with a concrete pour.

A further object of the invention is to provide a conduit support that will support a conduit by its end during a concrete pour.

Another object of the invention is to provide a conduit support that can be anchored to a form by simply nailing the support to the form.

A further object of the invention is to provide a pathway for running electrical cables between horizontal concrete floors or vertical walls.

A further object of the invention is to provide a conduit support that includes a ganging mechanism for ganging with one or more additional conduit supports for additional conduits.

A yet further object is to save time and expense by eliminating the need for an elaborate and expensive support system for multiple EMT conduit.

A further object of the invention is to provide a conduit support that includes a means of capping the end of a conduit.

A further object of the invention is to provide a conduit support that includes a flange with a removable center portion.

These and other objects and advantages of the present invention will be better understood by reading the following description along with reference to the drawings.

BRIEF DESCRIPTION OF THE SEVERAL VIEWS OF THE DRAWING(S)

Reference is made herein to the accompanying drawings, which are not necessarily drawn to scale, and wherein:

FIG. 7 is a plan view of two conduit supports ganged together in accordance with embodiments of the invention.

FIG. 8 is a side view of the ganged conduit supports of FIG. 7.

DETAILED DESCRIPTION

Figure 1:
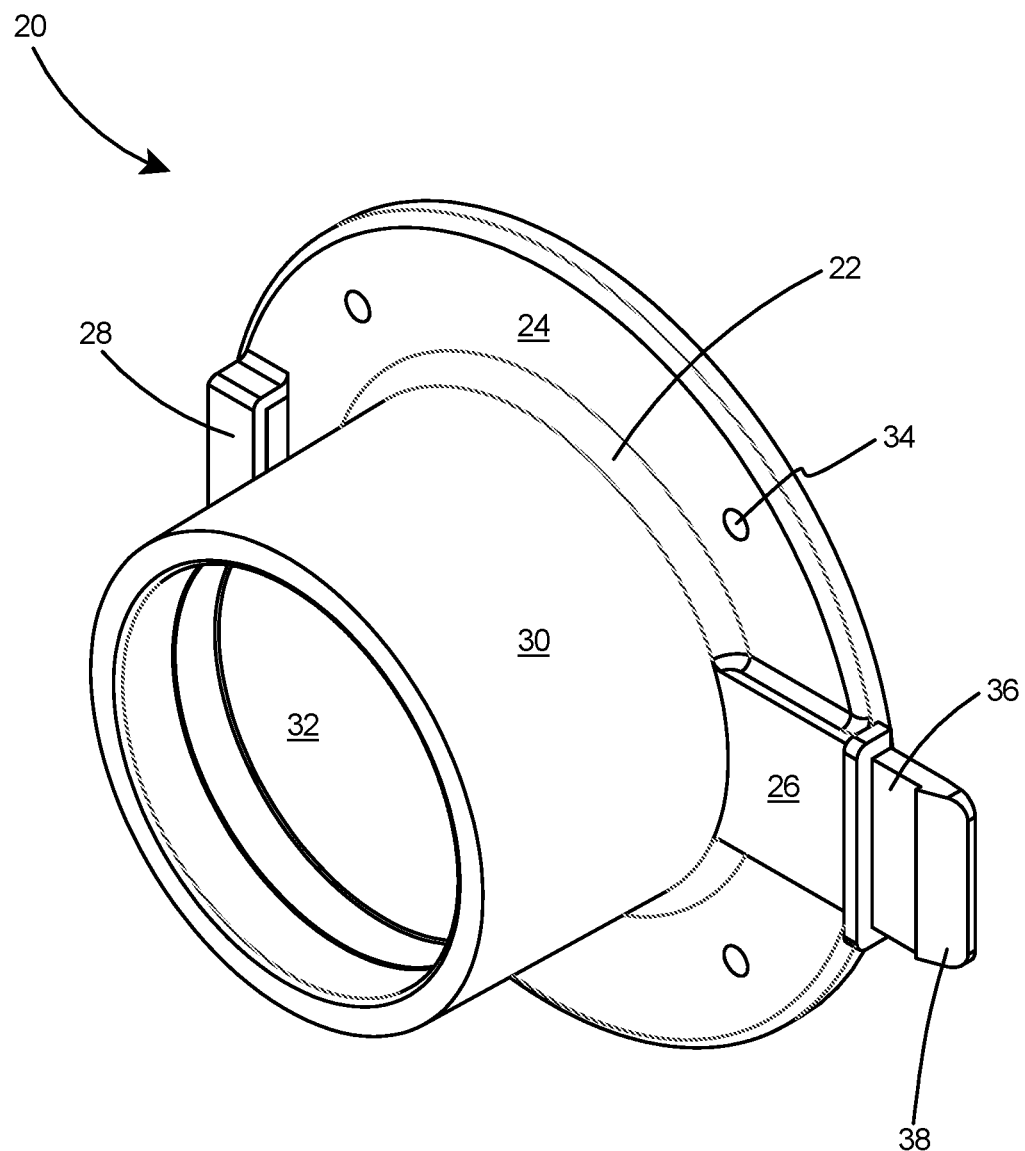
FIG. 1 is a front perspective view of a gangable flanged conduit support for electrical conduit in accordance with embodiments of the invention.

With reference to FIG. 1, the present invention is a flanged conduit support 20 for electrical metal tubing (EMT). The flanged conduit support 20 includes a support body 22 having a flange 24, a male snap member 26, and a female snap member 28. A hub 30 extends from the flange 24 and includes a socket 32 therein. One or more apertures 34 are provided in the flange.

Figure 2:
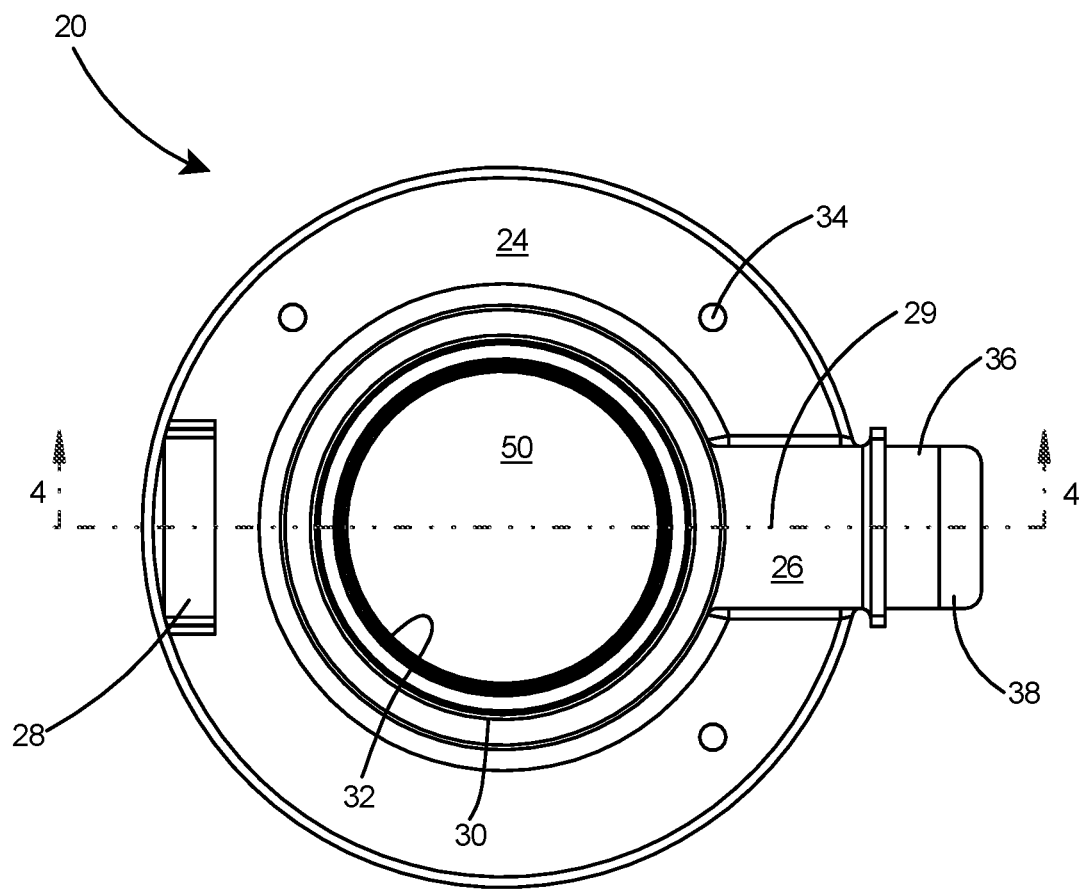
FIG. 2 is a plan view of the flanged conduit support.
Figure 3:
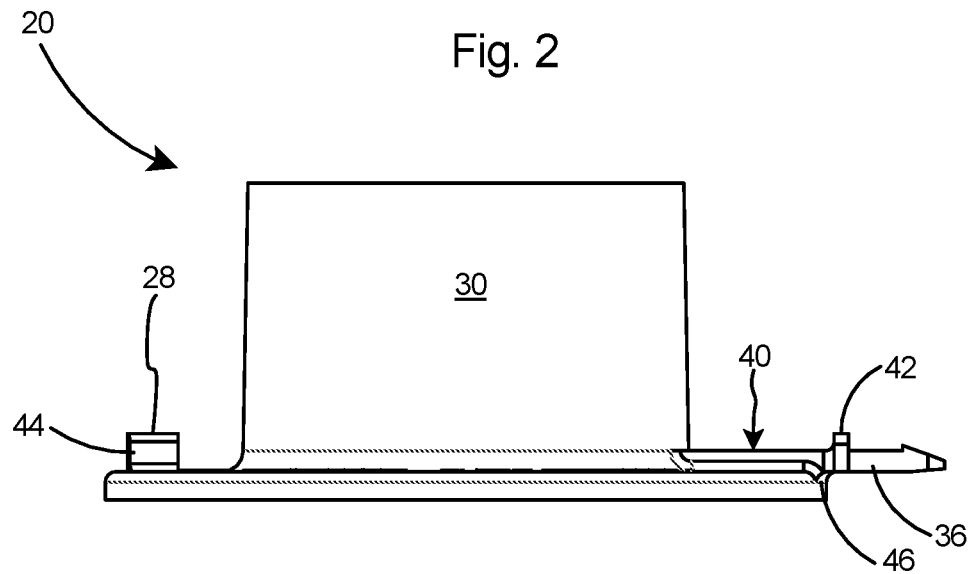
FIG. 3 is a side view of the flanged conduit support.

Referring to FIGS. 2-3, the male snap member 26 of the flanged conduit support 20 includes a tab 36 with a tapered end 38. The tab 36 is substantially planar with the flange 24 and includes a top surface 40 with a first stop 42 extending therefrom. The female snap member 28 extends from the flange 24 on the opposing side of the hub 30 and includes a receiving slot 44. The male and female snap members 26 and 28 are aligned along a common axis 29 through the center of the hub 30 and the male and female snap members are 180 degrees apart with respect to the hub.

Figure 4:
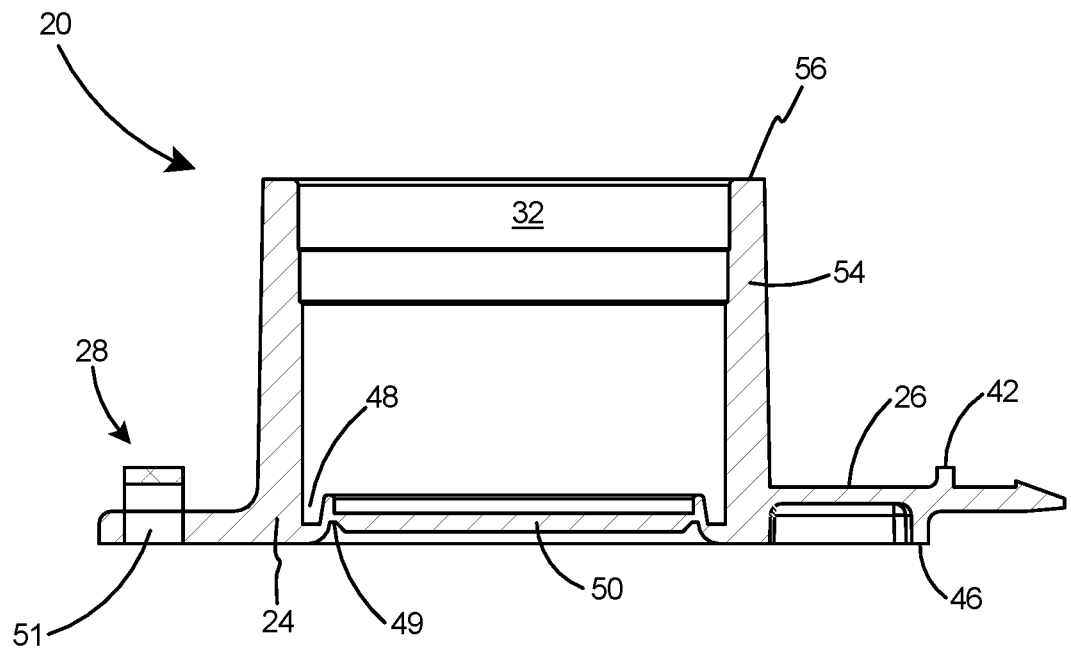
FIG. 4 is a sectional view of the flanged conduit support taken along line 4-4 of FIG. 2.
Figure 5:
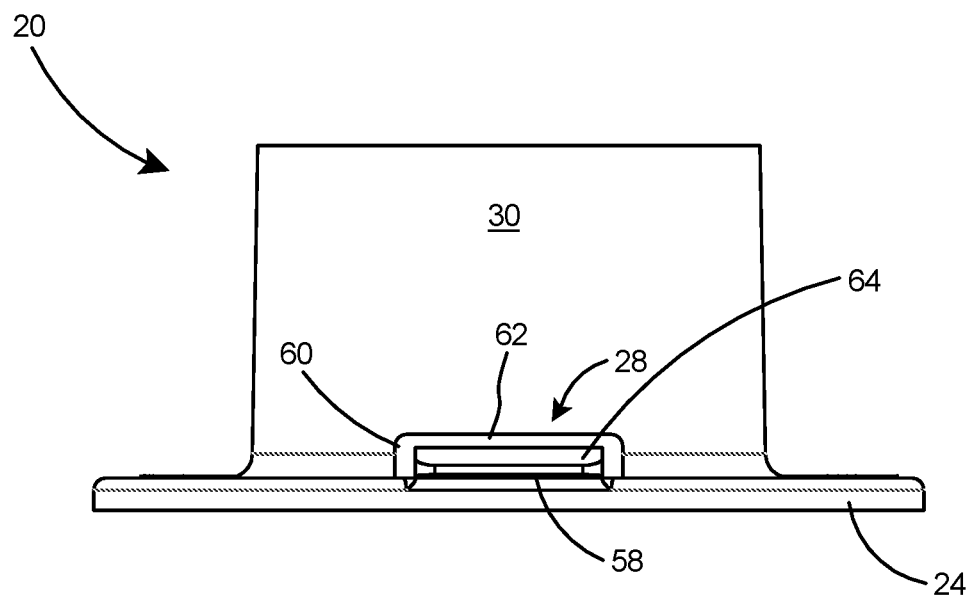
FIG. 5 is a side view of the flanged conduit support.
Figure 6:
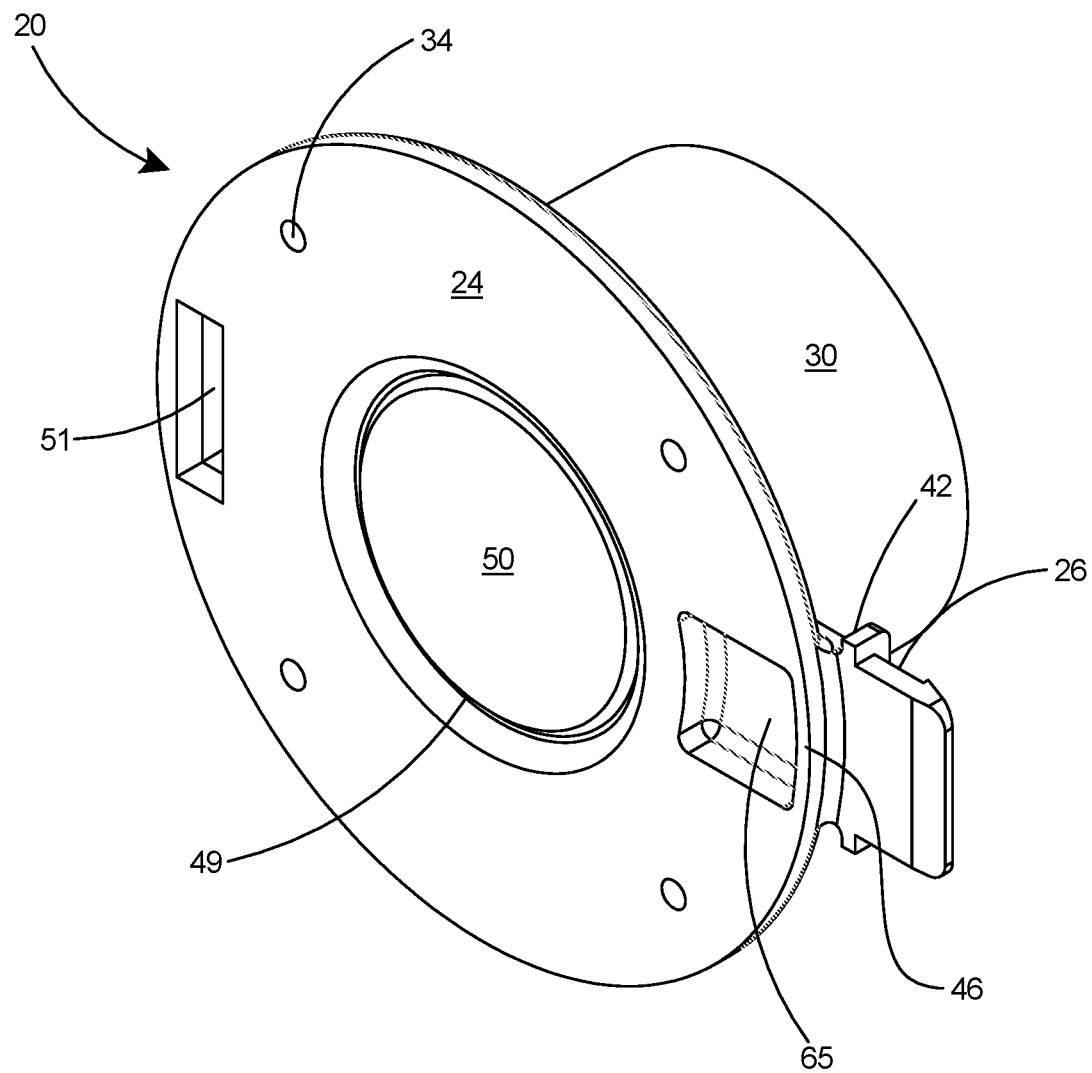
FIG. 6 is a rear perspective of the flanged conduit support of FIG. 1.

As shown in FIG. 4, the male snap member 26 further includes a second stop 46 that extends from the lower surface of the tab 36 on the male snap member 26. A conduit seat 48 is provided in the flange 24 within the socket 32 and around the inner periphery of the hub 30. An outer groove 49 is provided on the outer side of the flange 24 thereby creating a removable flange portion 50 that may be removed by scoring along groove 49 with a utility knife or similar tool. The groove 49 the outer side of the flange 24 is of lesser diameter than the diameter of the conduit seat 48 on the opposing side of the flange 24 and within the socket 32. The flanged conduit support can be configured as a bushing with the flange removed or as a cap with the flange intact. An opening 51 on the outer side of the flange 24 opposite the female snap member 28 provides a means for visually verifying full engagement of the male snap member 26 when two conduit supports are snapped together (see FIG. 10). The walls 54 defining the socket 32 are tapered inward from the outer rim 56 of the socket to the flange 24, thus providing the socket 32 a wider inner diameter at the rim 56 and a narrower diameter to the socket 32 at the flange 24 or its innermost extent. As shown in FIG. 5, the female snap member 28 includes a base 58, two sidewalls 60 extending from the base 58, and a top wall 62 defining a receiving slot 64 therein. The opening 51 in the flange is in communication with the receiving slot 64 of the female snap member 28. As shown in FIG. 6, a recess 65 is provided in the bottom surface of the flange 24 adjacent the second stop 46.

With reference to FIGS. 7-8, one or more conduit supports 20A, 20B may be ganged together by inserting the male snap member 26 within the female snap member 28 of the adjacent conduit support. To gang the conduit supports together as illustrated in FIG. 7, tapered end 38 of tab 36 of male snap member 26 is slid within the receiving slot 64 of the female snap member 28.

Figure 9:
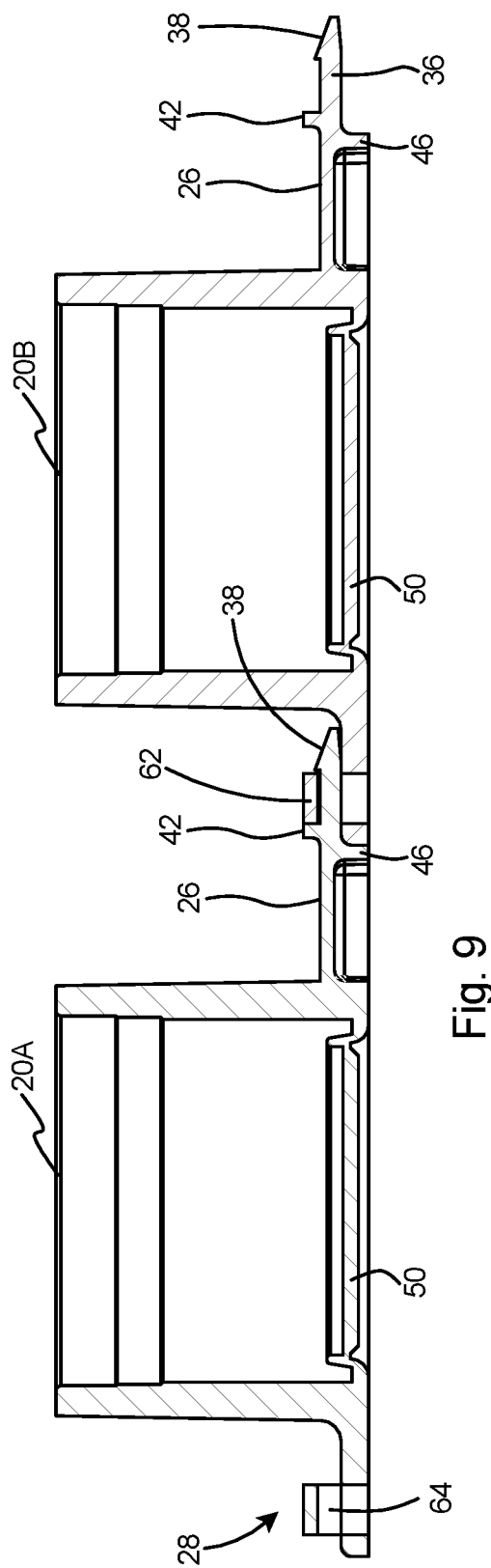
FIG. 9 is a sectional view of the ganged conduit supports taken along line 9-9 of FIG. 7.
Figure 10:
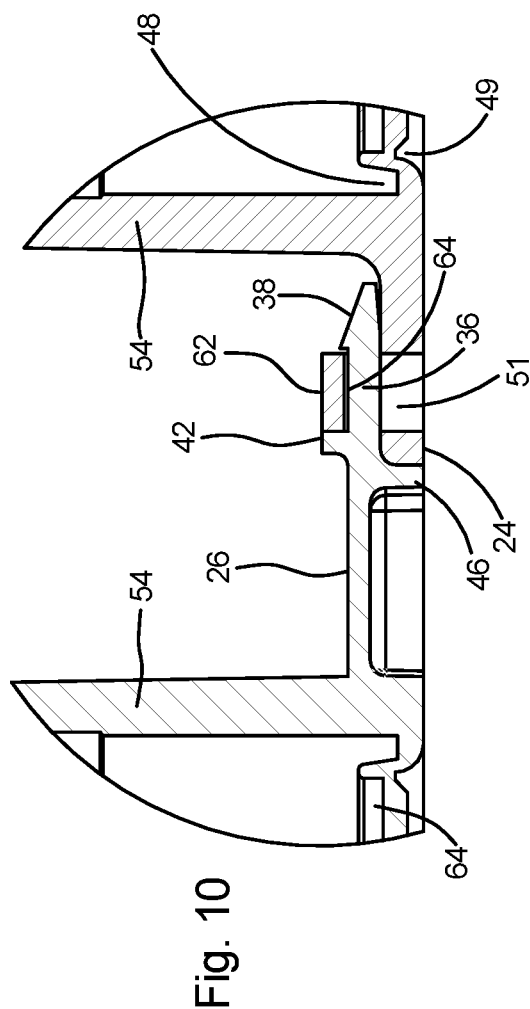
FIG. 10 is a detail view of the joined portions of the ganged conduit supports.
Figure 11:
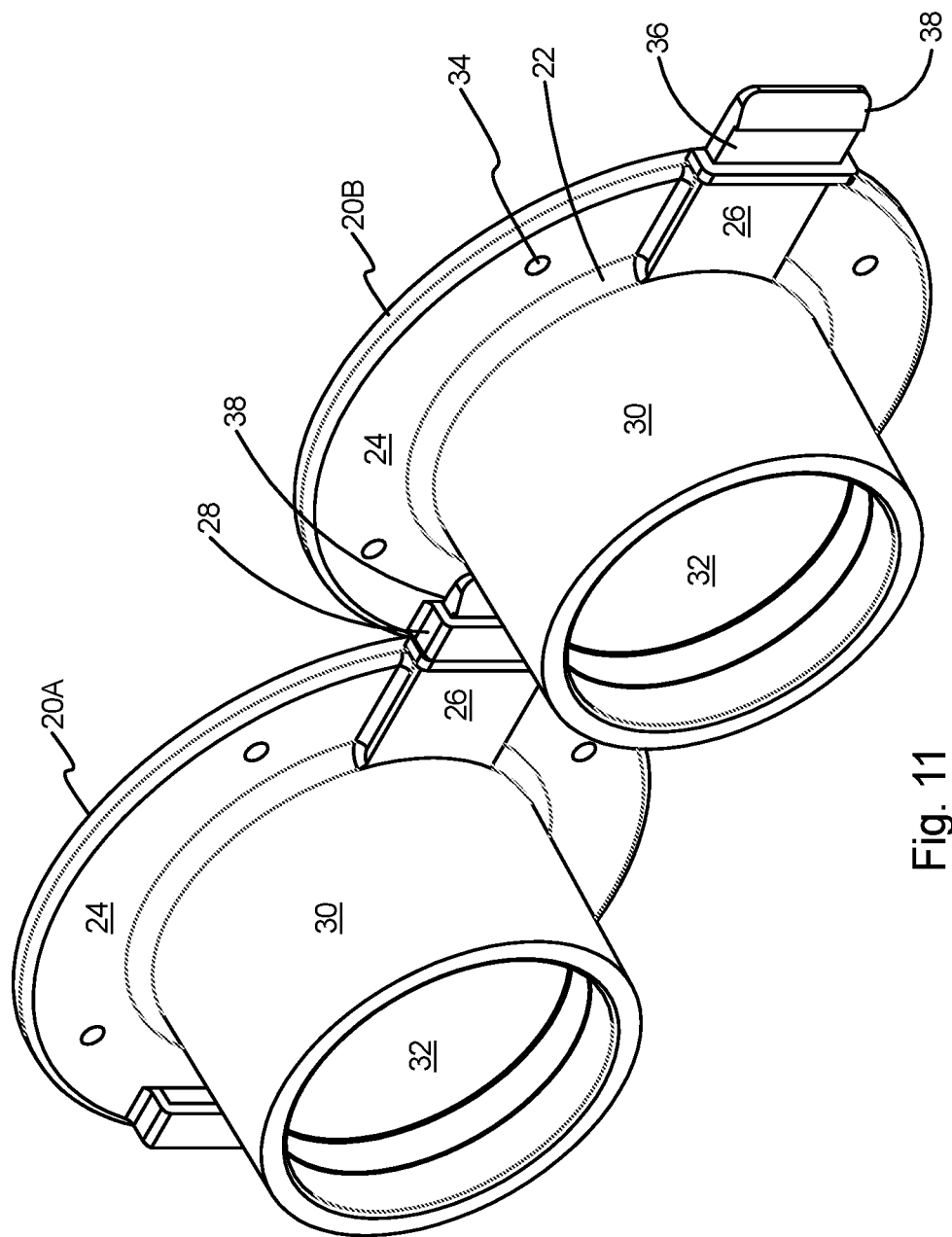
FIG. 11 is a perspective view of the ganged conduit supports of FIG. 7.

Referring to FIGS. 9-10, in order to gang the conduit supports, the tapered end 38 of tab 36 of the first conduit 20A is slid within the receiving slot 64 of the female snap member 28 until first stop 42 of the male snap member 26 engages the top wall 62 of the female snap member 28 and second stop 46 of the male snap member 26 engages the flange 24 of the second conduit 20B.

Figure 12:
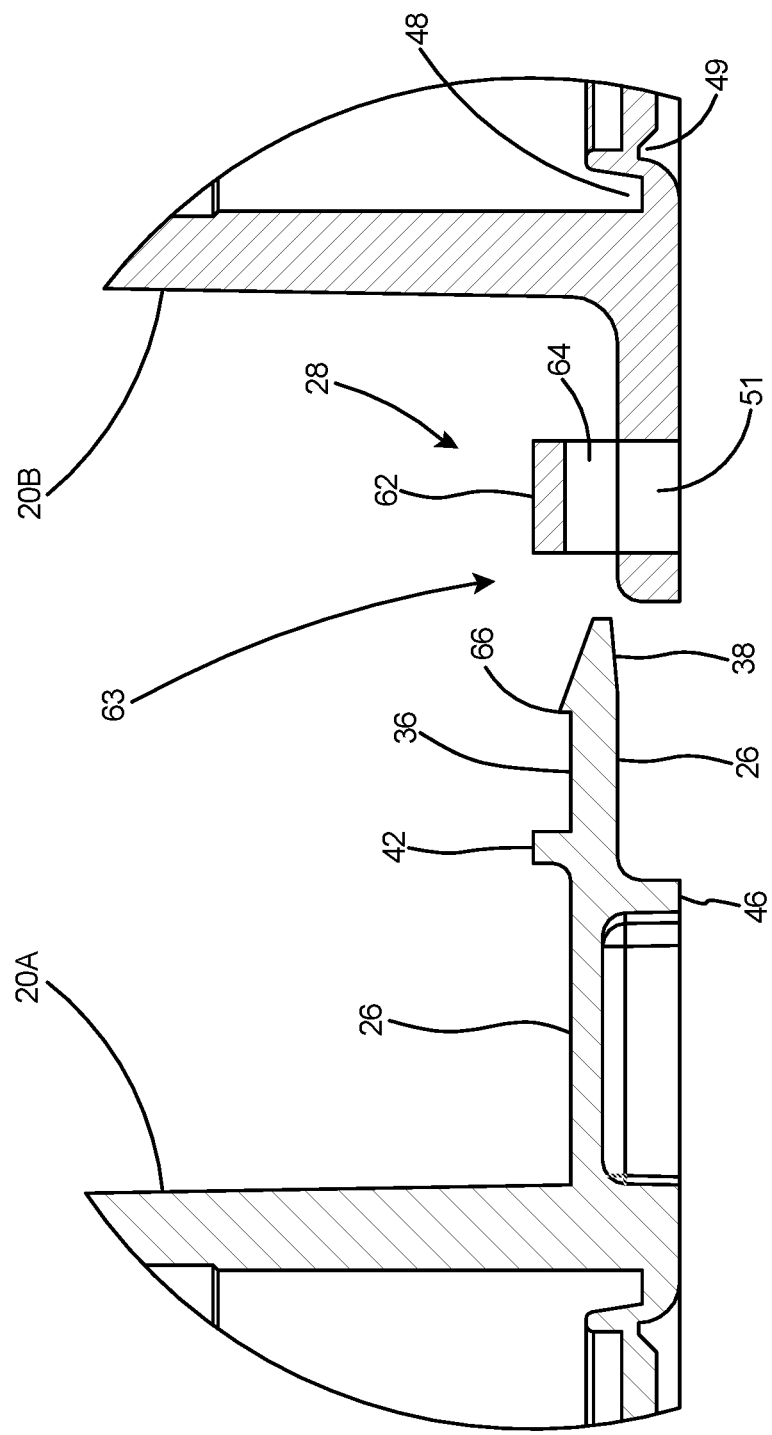
FIG. 12 is a detail view of two adjacent portions of the ganged conduit supports in alignment to be snap fitted together.

With reference to FIG. 12, tapered end 38 of male snap member 26 includes a barb 66 that is wider than the tab 36 portion of the male snap member 26 and wider than the receiving slot 64 of the female snap member 28. The male snap member 26 and top wall of the female snap member form a locking means 63 for locking two or more conduit supports together. As the male snap member 26 is pressed through the receiving slot 64, a distinct snap engagement occurs as barb 66 clears the top wall 62 of the female snap member 28, thereby locking the two conduits 20A and 20B securely together.

Figure 13:
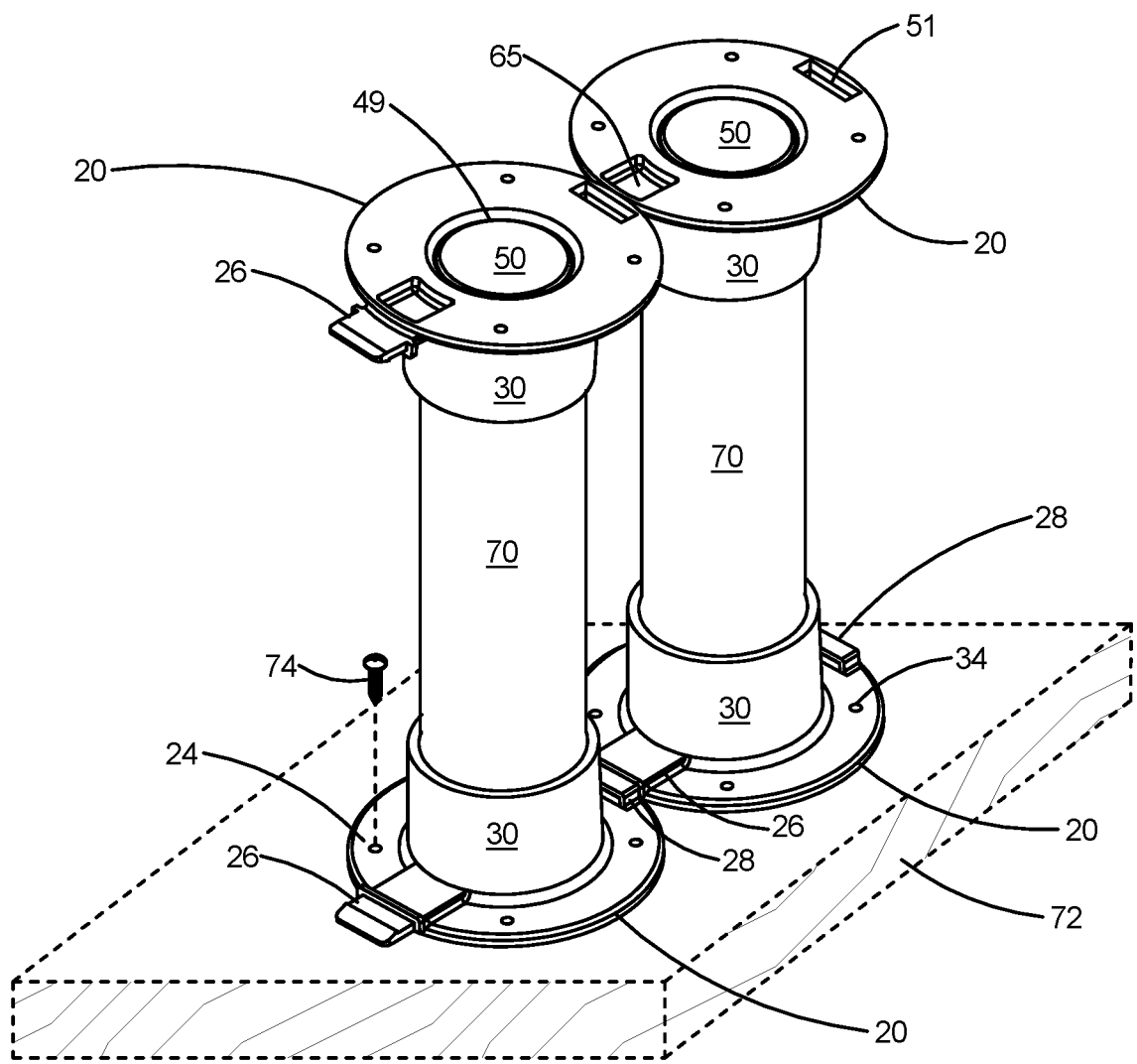
FIG. 13 is an isometric view of a plurality of flanged supports ganged together to support two conduit sections according to the invention.

Referring to FIG. 13, a plurality of flanged supports 20 are ganged together and support two sections of EMT conduit 70 that will form a pathway through a concrete pour area. One or more flanged supports 20 are snapped together and secured, with the hubs 30 facing up, to a form 72 or similar multilevel building structure into which concrete will be poured to create the floor. The flanges 24 of the lower flanged supports are simply nailed to the form. Conduit is then inserted the conduit into the lower flange supports 20 with the ends of the conduit captured by the conduit seats 48 (see FIG. 4) in each hub 30. A corresponding number of flanged supports 20 are then snapped together and fitted, with the hubs 30 facing down, on the top ends of each conduit. The removable flange portions or caps 50 on the upper flanged supports 20 are left intact to prevent concrete from entering the conduits 70 during the concrete pour.

Concrete (not shown) is then poured into the form and fills the volume extending from the top surface of the form 72 to the level of the flanges 24 of the upper flanged supports. After the concrete is cured and the form is removed, one or more of the removable flange portions 50 may be left intact for future installation of wiring or may be removed in order to pass electrical cables through one or more of the conduits 70.

Add additional conduit by joining the necessary bushings together using the built-in ganging mechanism. Cap the opposite ends of conduit with another set of bushings to seal off. After the concrete sets, remove the center of the cap to use as a bushing for low voltage cable. The flanged conduit supports will work with EMT, rigid IMC, or PVC rigid conduit. The flanged conduit supports are an easy to use, economical alternative for multiple conduit support.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A conduit support for forming a pathway through a concrete pour area, comprising:
a support body including a flange;
a hub on said flange;
a male snap member and a female snap member extending from the support body;
a removable flange portion on said flange;
a first stop on said male snap member; and a second stop on said male snap member;
said female snap member including a base, a top wall, and a side wall;
an opening on the outer side of the flange; and
said opening in the flange being in communication with the receiving slot of said female snap member.

2. The conduit support of claim 1, comprising a groove defining said removable flange portion.

3. The conduit support of claim 2, comprising:
a socket on said hub; and
said socket including a conduit seat.

4. The conduit support of claim 1, wherein said male snap member comprises:
a tab; and
a tapered end.

5. The conduit support of claim 4, wherein said female snap member includes a receiving slot therein.

6. The conduit support of claim 5, comprising a barb on said tab of said male snap member.

7. The conduit support of claim 1, comprising:
said male and female snap members aligned along a common axis through the hub; and said male and female snap members are 180 degrees apart on said common axis.

8. The conduit support of claim 3, comprising said groove is of lesser diameter than the diameter of the conduit seat.

9. The conduit support of claim 1, comprising a recess in said flange, said recess aligned along a common axis through said hub.

10. A conduit support for forming a pathway through a concrete pour area, comprising:
- a support body including a flange;
- a hub on said flange;
- a male snap member and a female snap member extending from the support body;
- a removable flange portion on said flange;
- a tab and a tapered end on said male snap member;
- said female snap member includes a receiving slot therein;
- a barb on said tab of said male snap member; and
- said barb of said male snap member and a top wall of said female snap member comprise a locking means for locking two of said conduit supports together.

11. The conduit support of claim 1, comprising one or more apertures in said flange.

12. The conduit support of claim 3, wherein said socket comprises:
- walls and an outer rim; and
- said walls are tapered inward from the outer rim of the socket to the flange.

13. A method of securing two or more sections of conduit together to create pathways in a concrete pour area defined by a form, said method comprising;
- two or more flanged supports each including a support body, a flange, a hub including a socket, a removable flange portion on said flange, and locking means on said flange;
- securing a first set of said two or more of said flanged supports together with said locking means;
- securing said first set of flanged supports to said form;
- inserting a conduit section into each of said flanged supports secured to said form;
- securing a second set of flanged supports together with said locking means;
- pressing said second set of flanged supports onto the opposing ends of said conduit; and
- pouring concrete onto said form.

14. The method of claim 13, comprising:
- said locking means comprises a male snap member and a female snap member extending from the support body; and
- said removable flange portion is defined by a groove in said flange.

* * * * *